(12) United States Patent
Jacobs et al.

(10) Patent No.: US 7,903,183 B2
(45) Date of Patent: Mar. 8, 2011

(54) DISPLAY INCLUDING BACKLIGHT OPERABLE IN 2D AND 3D MODES

(75) Inventors: Adrian M. S. Jacobs, Oxford (GB); Allan Evans, Oxford (GB); Grant Bourhill, Stow-on-the-World (GB)

(73) Assignee: Sharp Kabushiki Kaisha, Osaka (JP)

( * ) Notice: Subject to any disclaimer, the term of this patent is extended or adjusted under 35 U.S.C. 154(b) by 994 days.

(21) Appl. No.: 10/597,088

(22) PCT Filed: Jan. 14, 2005

(86) PCT No.: PCT/IB2005/050169
§ 371 (c)(1),
(2), (4) Date: Apr. 17, 2007

(87) PCT Pub. No.: WO2005/071976
PCT Pub. Date: Aug. 4, 2005

(65) Prior Publication Data
US 2007/0216828 A1    Sep. 20, 2007

(30) Foreign Application Priority Data
Jan. 17, 2004   (GB) ................................. 0401064.1

(51) Int. Cl.
*G02F 1/13357*   (2006.01)
(52) U.S. Cl. .................. 349/15; 349/62; 349/65; 349/71
(58) Field of Classification Search ................. None
See application file for complete search history.

(56) References Cited

U.S. PATENT DOCUMENTS

| 4,678,285 | A  | * | 7/1987 | Ohta et al. ..................... 349/71 |
| 5,432,876 | A  | * | 7/1995 | Appeldorn et al. ............. 385/31 |
| 5,897,184 | A  |   | 4/1999 | Eichenlaub et al. |
| 7,619,604 | B2 | * | 11/2009 | Karman et al. ................ 345/102 |
| 7,626,643 | B2 | * | 12/2009 | Ijzerman et al. ................ 349/15 |
| 2005/0264717 | A1 | * | 12/2005 | Chien et al. .................... 349/61 |
| 2005/0276071 | A1 | * | 12/2005 | Sasagawa et al. ............. 362/607 |
| 2008/0278640 | A1 | * | 11/2008 | Ijzerman et al. ................ 349/15 |

FOREIGN PATENT DOCUMENTS
EP    0 829 744 A2    9/1997

OTHER PUBLICATIONS

International Search Report for corresponding Application No. PCT/IB2005/050169 mailed Jun. 10, 2005.

* cited by examiner

*Primary Examiner* — Mike Stahl
(74) *Attorney, Agent, or Firm* — Renner, Otto, Boisselle & Sklar, LLP

(57) ABSTRACT

A display comprises a backlight (30, 45-48) and a spatial light modulator (1) such as a liquid crystal device for modulating light from the backlight (30, 45-48). The backlight has a light-output surface (45) with a first set of regions in the form of parallel evenly spaced strips (48). In a multiple-view mode of the display, these strips (48) emit light whereas the remainder of the output surface (45) is dark. In a single-view mode of operation of the display, the whole of the output surface (45) emits light substantially evenly across the display area of the modulator (1).

36 Claims, 17 Drawing Sheets

[Fig. 9]

DISPLAY INCLUDING BACKLIGHT OPERABLE IN 2D AND 3D MODES

The present invention relates to a display. Such a display has two modes of operation, namely a single-view mode and a multiple-view mode. The multiple-view mode may be used to display images which may be unrelated to different viewers. As an alternative, the multiple-view mode may be used to display homologous stereoscopic pairs of views to one or more viewers so as to provide an autostereoscopic three-dimensional (3D) display, in which case the single-view mode may be referred to as a two-dimensional (2D) mode.

Displays which are capable of operating in 2D and 3D modes are disclosed, for example, in EP0829744, GB2390172 and JP03119889. In such arrangements, the ability to switch between such modes is provided by attaching additional components to a standard 2D display such as a liquid crystal display.

U.S. Pat. Nos. 4,717,949 and 4,829,365 disclose an autostereoscopic having a backlight which provides light-emitting lines separated by dark areas. However, such a display is not capable of operating in single view or 2D mode.

U.S. Pat. No. 5,897,184 discloses another display which can be switched between 2D and 3D modes. The display comprises a liquid crystal device with rear illumination provided by a light guide structure. A liquid crystal device acts as a switchable diffuser between the light guide and the panel.

According to a first aspect of the invention, there is provided a liquid crystal display comprising a backlight and a spatial light modulator for modulating light from the backlight, the backlight having a light-output surface, at least one portion of which comprises a plurality of first regions arranged to output light in a multiple-view mode of the display, the whole of the at least one portion being arranged to output light in a single-view mode of the display.

The at least one portion may comprise a plurality of second regions arranged to output light alternately with the first regions for temporal multiplexing of views in the multiple-view mode.

The at least one portion may comprise a plurality of second regions with the first and second regions being independently controllable to emit light for observer tracking in the multiple-view mode.

The first regions may comprise first light-redirecting elements adapted to redirect light travelling in a first direction but not a second direction towards the spatial light modulator, and a remainder of the at least one portion may comprise second light-redirecting elements adapted to redirect light travelling in the second direction but not the first direction towards the spatial light modulator.

The first and second directions may be substantially orthogonal.

The backlight may comprise: a light guide on which the light-redirecting elements are disposed, a first light source for supplying light to the light guide in the first direction, and a second light source for supplying light to the light guide in the second direction.

The backlight may comprise: a first light guide having the first regions; a first visible light source for supplying light to the first light guide; a second light guide having a remainder of the at least one portion; and a second visible light source for supplying light to the second light guide.

The first light guide may have a higher refractive index than the second light guide.

The first light guide may be disposed on an output surface of the second light guide.

The first and second light sources may be arranged to supply light in the first and second directions respectively.

The first and second light-redirecting elements may be provided on a surface of e ach of the first and second light guides respectively.

Each of the first and second light guides may comprise at least one waveguide. As an alternative, each of the first and second light guides may comprise a plurality of optical fibres.

The first and second light guides may be separated from each other by a material of lower refractive index, such as air.

Non-input and non-output surfaces of the first and second waveguides may be at least partially covered by a non-transmissive material, which may be reflective.

The backlight may comprise a lightguide, a visible light source for supplying light to the lightguide, first fluorescent material forming the first regions, and a first ultraviolet light source for illuminating the fluorescent material.

Filter material may be disposed between the backlight and the first regions for blocking visible light and for passing ultraviolet light from the first ultraviolet light source to the first regions.

Filter material may be disposed between the at least one portion and the spatial light modulator for blocking ultraviolet light.

The visible and ultraviolet light sources may be arranged to supply light in the first and second directions respectively.

The first and second light-redirecting elements may be provided on a surface of the light guide.

The fluorescent material may be dispersed in a visible light scattering medium.

The first fluorescent material of each first region may be arranged to emit light of two colour components.

The at least one portion may comprise a plurality of third regions arranged to output light in a further multiple-view mode of the display.

The at least one portion may comprise a plurality of third regions formed by second fluorescent material, the backlight comprising a second ultraviolet light source, the first and second ultraviolet light sources being arranged to emit first and second wavelengths in response to which the first and third fluorescent materials, respectively, fluoresce.

The first and third regions may be substantially disposed in first and second planes, respectively, which are spaced apart in a direction of light output from the backlight.

The first and third regions may extend in orthogonal directions.

The first regions may be elongate. The first regions may be substantially parallel. The first regions may be substantially uniformly spaced apart.

The display may comprise an array of lenses at the first regions.

The at least one portion may comprise a plurality of second regions arranged to output light in the multiple-view mode.

The display may comprise an array of lenses, with each lens of the array being arranged to receive light from at least one first region and at least one second region and to direct the received light in first and second different directions respectively towards the spatial light modulator.

The first and second regions may be arranged to output light simultaneously in the single-view mode of the display.

The display may comprise a plurality of further regions, with each lens of the array being arranged to receive light from at least one further region and to direct the light in a further direction, different to the first and second directions, towards the spatial light modulator.

The first, second and further regions may be arranged to output light simultaneously in the single-view mode of the display.

The spatial light modulator may have a transmissive mode of operation. The spatial light modulator may be a liquid crystal device.

It is thus possible to provide a display which can be switched between single-view and multiple-view modes of operation without requiring the presence of additional components of significant weight, size or cost as compared with a display having only a multiple-view mode of operation. Relatively thin multi-mode displays can therefore be provided with little or no additional complication, weight, thickness or cost compared even with known types of single-view or 2D displays. Efficient use of light generated in the backlight can be made and the brightnesses in the two modes of operation may be controlled substantially independently, for example so as to have equal brightnesses in the single-view mode and in the multiple-view mode.

The invention will be further described, by way of example, with reference to the accompanying drawings, in which.

Like reference numerals refer to like parts throughout the drawings.

Figure 1:
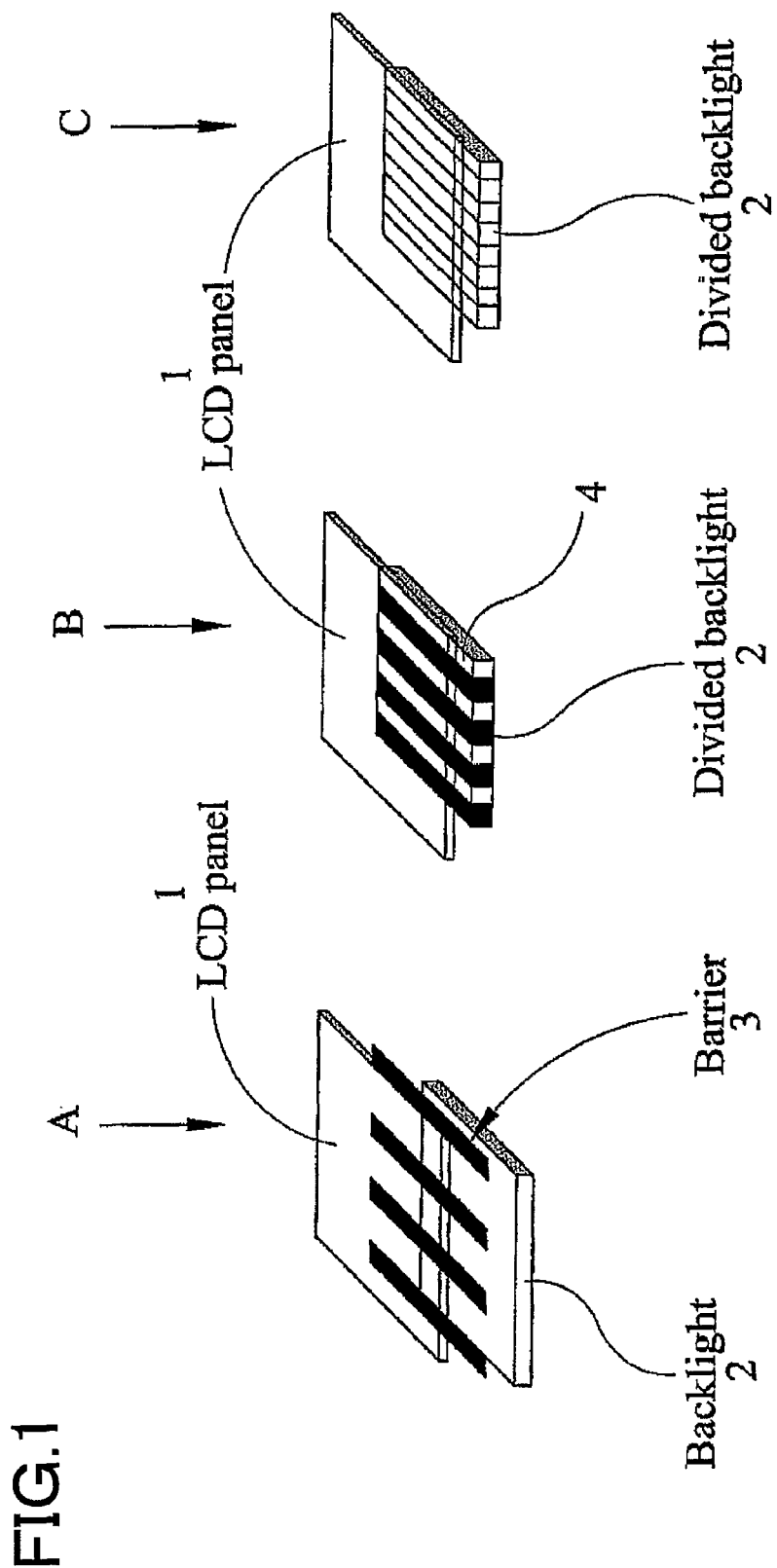
FIG. 1 illustrates diagrammatically a known type of multiple-view display and a display constituting an embodiment of the invention operating in 3D or multiple-view mode and in 2D or single-view mode.

FIG. 1 illustrates at A a known type of multiple-view display comprising a liquid crystal display panel 1 and a backlight 2. A parallax barrier 3 is disposed between the panel 1 and an extended output surface of the backlight 2. The backlight 2 typically comprises a waveguide and a light source, such as a cold cathode fluorescent lamp or a light emitting diode (LED).

Such a display is capable of supplying unrelated images to different viewers or acting as an autostereoscopic display when homologous pairs of images are viewed by the respective eyes of a viewer.

In order to be able to operate in a single-view or 2D mode of operation, it is necessary to defeat the parallax-generating function of the parallax barrier 3. Examples of arrangements for achieving this include the use of additional devices, such as switchable diffusers, and parallax barriers which can effectively be switched off for the single-view mode. Such arrangements generally make the display thicker, heavier, more complicated and more expensive than a display having only a single-view mode, in which the parallax barrier 3 and any other elements required for switching modes are not required.

FIG. 1 shows at B and C a display constituting an embodiment of the invention and operating in multiple-view and single-view modes, respectively. This display differs from that shown at A in that the parallax barrier is not required and the backlight 2 is switchable so as to provide the two modes of operation in conjunction with the images being displayed by the LCD panel 1. The backlight 2 has a light-output surface, which is divided so as to provide first regions such as 4 which emit light in the multiple-view mode and which are arranged as elongated parallel evenly spaced thin light sources cooperating with the pixel structure of the panel 1 to define viewing regions for the eyes of one or more viewers in 3D operation or for different viewers when unrelated images are being displayed.

In the single-view mode illustrated at C, the whole of the light-output surface of the backlight 2 emits light so that the display ceases to be substantially directional and the full spatial resolution of the panel 1 is available for displaying an image which can be viewed throughout a wide viewing region.

Figure 2:
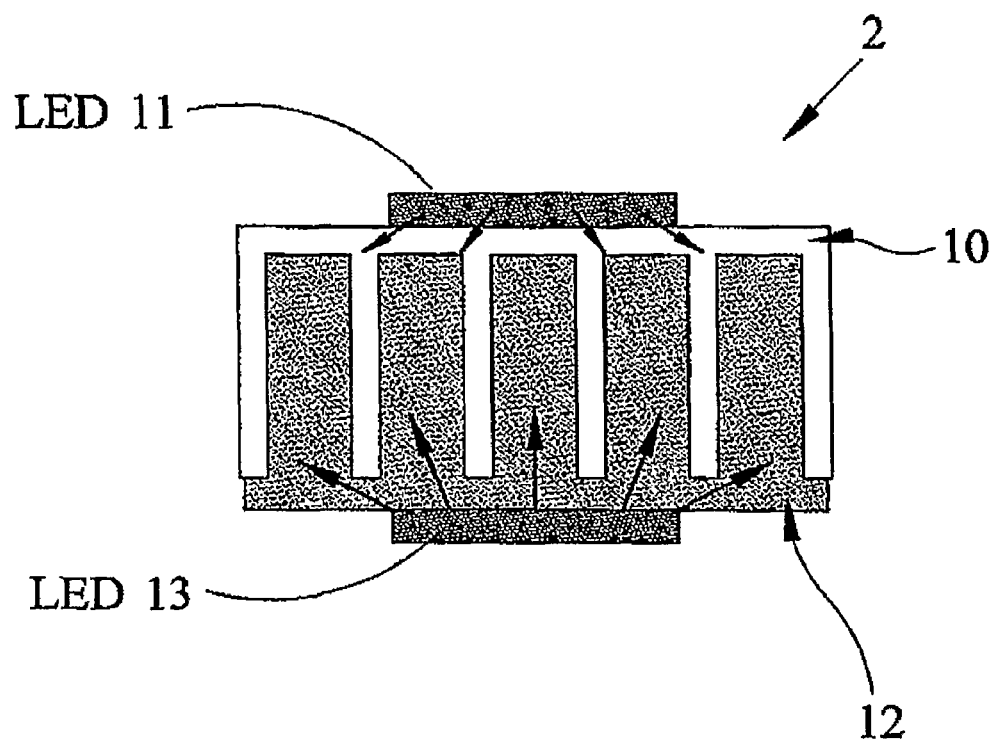
FIGS. 2 and 3 are diagrammatic plan views of backlights for use in displays constituting embodiments of the invention.

FIG. 2 illustrates an example of a divided backlight which may be used to provide the two modes of operation as illustrated in FIG. 1. The backlight comprises a waveguide having two light-guiding portions. A first portion 10 receives light from a first LED 11, which is switched on during the multiple-view mode of operation. A second portion 12 provides the dark regions between the line sources in the multiple-view mode. The second portion 12 has a refractive index which is lower than that of the first portion 10. Thus, at the interfaces between the first and second portions, light from the LED 11 is totally internally reflected.

When the display is required to operate in the 2D or single-view mode, a further LED 13 supplies light to the portion 12 with the LED 11 continuing to supply light to the portion 10. The whole of the output surface of the backlight thus supplies light to the LCD panel.

The waveguide comprising the portions 10 and 12 may be manufactured as a single unit, for example by injection moulding, and the structure at the output surface of the waveguide may be arranged to provide substantially uniform intensity of illumination across the area of the panel 1. As an alternative, the waveguide may be formed by an array of optical fibres arranged in a plane with alternating fibres illuminated by different visible light sources.

LEDs typically have an operating region within which a substantially linear relation exists between current through the diode and output light intensity. For a given amount of electrical power consumption, it is possible to achieve substantially the same total brightnesses in the single-view and multiple-view modes of operation of the backlight.

Figure 3:
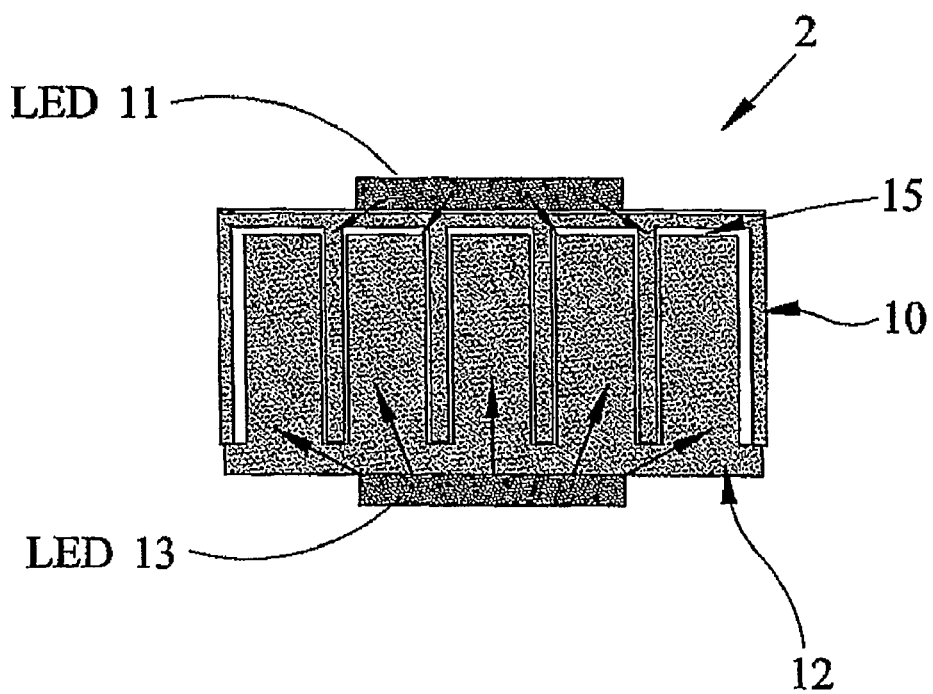

FIG. 3 illustrates a backlight of a similar type to that shown in FIG. 2 but in which the portions 10 and 12 are physically separated from each other and may be of materials of the same refractive index. The individual waveguides 10 and 12 are separated by a narrow region of low refractive index material. For example, the region 15 may be in the form of an air gap, for example produced by mechanical, chemical etching or photolithographic techniques.

Figure 4:
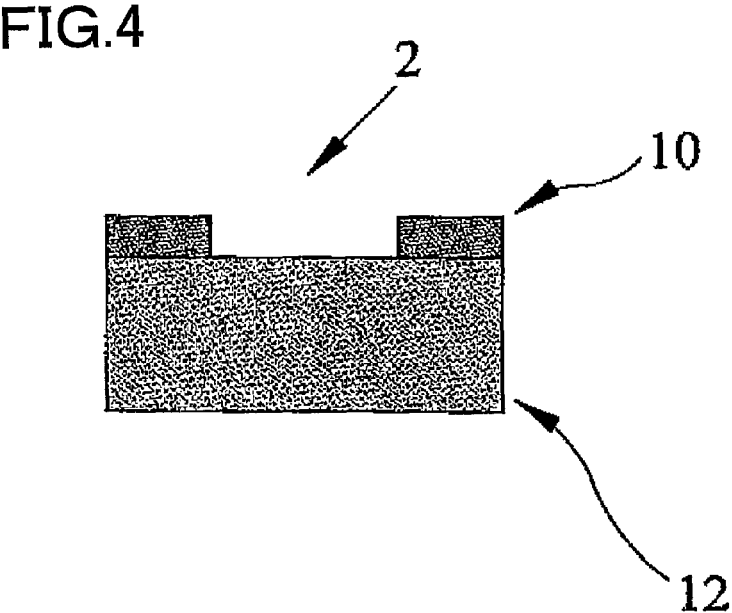
FIG. 4 is a diagrammatic side view of another backlight for use in displays constituting embodiments of the invention.

FIG. 4 illustrates another light guide arrangement in which the region 10 of relatively high refractive index is formed by depositing a patterned layer of suitable material on top of the portion 12 of lower refractive index.

Figure 5:
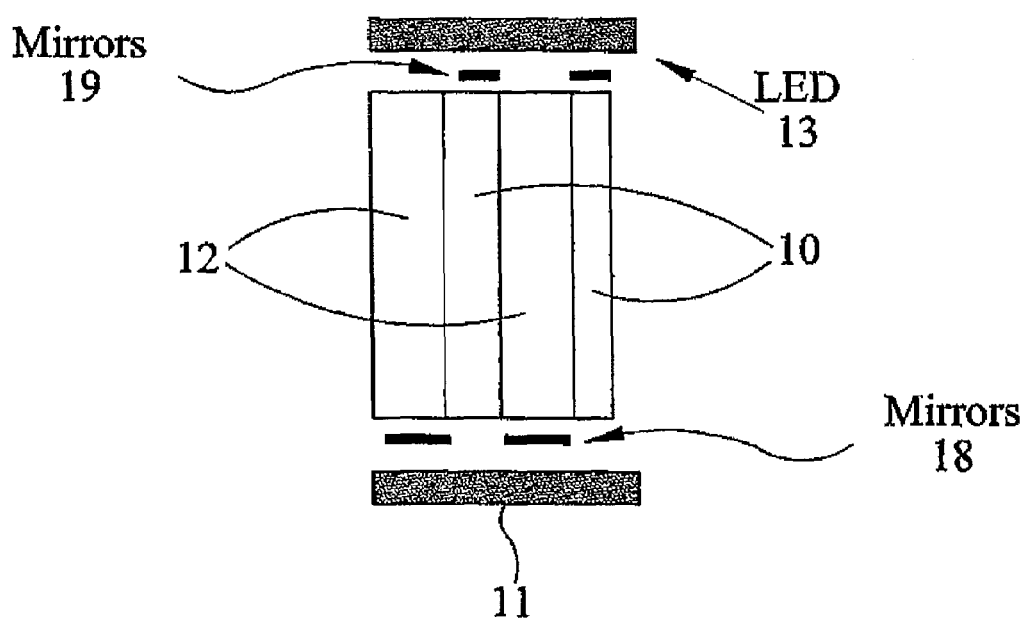
FIG. 5 is a diagrammatic plan view of another backlight for use in displays constituting embodiments of the invention.
Figure 6:
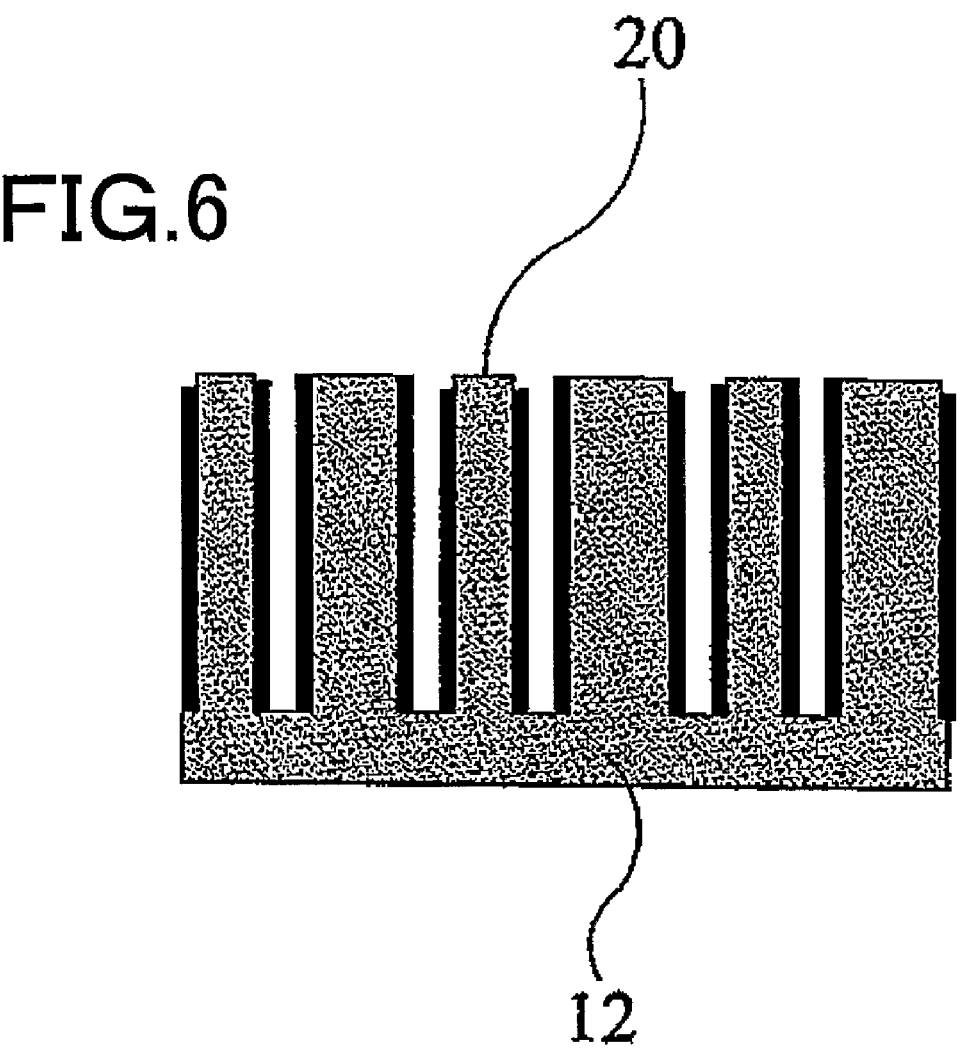
FIG. 6 is a diagrammatic plan view of part of the backlight shown in FIG. 3.

Confinement of light such that it is output from the correct surface regions of the backlight may be improved by the addition of reflective or opaque coatings at appropriate surfaces of the portions 10 and 12. For example, as illustrated in FIG. 5, mirrors 18 are arranged between the LED 11 and the portion 12 so as to prevent light from the LED 11 entering the portion 12 and so as to return light which would otherwise be lost for re-use. Similarly, mirrors 19 are provided to perform the same function in respect of the portions 10 and the LED 13. In the case of a light guide arrangement of the type shown in FIG. 3, the walls of the air gaps or the like may be coated with opaque or reflecting material as illustrated at 20 in FIG. 6.

Figure 7:
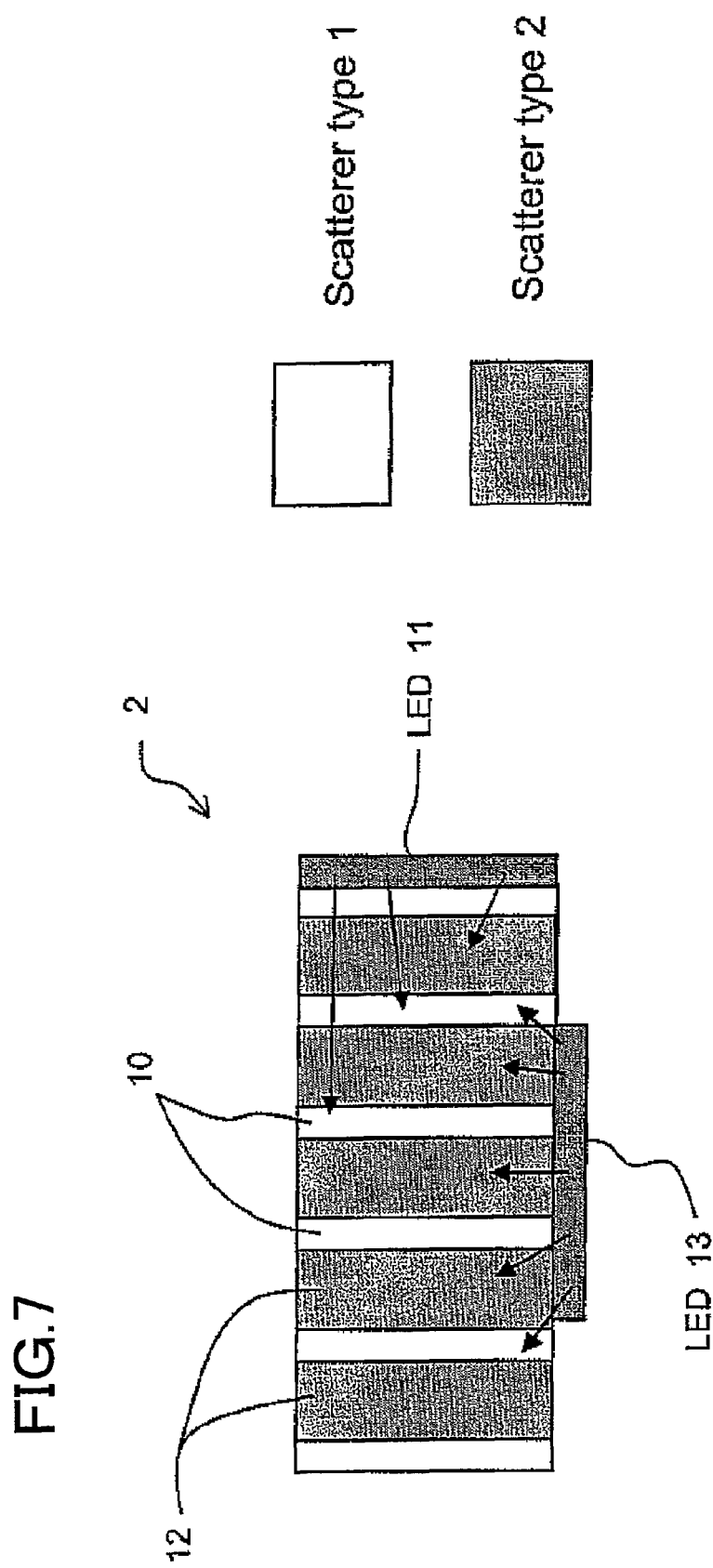
FIG. 7 is a diagrammatic plan view of another backlight for use in displays constituting embodiments of the invention.

FIG. 7 illustrates another backlight 2 embodying the present invention. In a conventional backlight, prismatic or other similar light scattering structures are often provided on the input or output surface of a light guide to cause scattering and to allow the outcoupling of the light from the light guide to the exterior. In the FIG. 7 arrangement, such scattering or other such light-redirecting structures are specifically shaped so as to provide selective scattering of light away from the light-output surface of the light guide only for light coming from a particular direction in the light guide.

In this embodiment, the backlight 2 comprises an undivided light guide structure, with the first and second portions 10 and 12 described above being defined respectively by first and second types of scatterer provided on the light-output surface of the backlight 2. A first LED 11 is provided to one side of the light guide and supplies light into the light guide which is generally across the extension direction of the first and second elongate portions 10 and 12. A second LED 13 is provided to an orthogonal side of the light guide with respect to the first LED 11, and supplies light into the light guide which is generally directed along the extension direction of the first and second elongate portions 10 and 12.

The first type of scatterers disposed in the first portion 10 are adapted to scatter light away from the light-output surface of the light guide substantially only for light travelling perpendicular to the extension direction of the first and second elongate portions 10 and 12. Therefore the scatterers in the first portion 10 respond strongly to light from the first LED 11, but there is substantially no scattering of light from the second LED 13 since substantially no light from the second LED 13 is travelling in the direction to which the first type of scatters responds.

The second type of scatterers disposed in the second portion 12 are adapted to scatter light away from the light-output surface of the light guide substantially only for light travelling parallel to the extension direction of the first and second elongate portions 10 and 12. Therefore the scatterers in the second portion 12 respond strongly to light from the second LED 13, but there is substantially no scattering of light from the first LED 11 since substantially no light from the first LED 11 is travelling in the direction to which the second type of scatters responds.

In view of the above-described behaviour, when the first LED 11 is switched on and the second LED 13 is switched off, light is scattered away from the light-output surface of the backlight 2, and towards the LCD panel 1, substantially only in the first portion 10. Likewise, when the second LED 13 is switched on and the first LED 11 is switched off, light is scattered away from the light-output surface of the backlight 2, and towards the LCD panel 1, substantially only in the second portion 12. When both LEDs 11 and 13 are switched on, light is scattered away from the light-output surface in both the first and second portions 10 and 12.

Therefore the 3D or multiple-view mode of operation can be achieved by switching the first LED 11 on and the second LED 13 off, while the 2D or single-view mode of operation can be achieved by switching both LEDs 11 and 13 on. The second portion 12 provides the dark regions between the line sources in the multiple-view mode.

It will be appreciated that it is possible that the selective scattering function of the FIG. 7 embodiment is provided in addition to the other methods described herein to provide enhanced performance.

Figure 8:
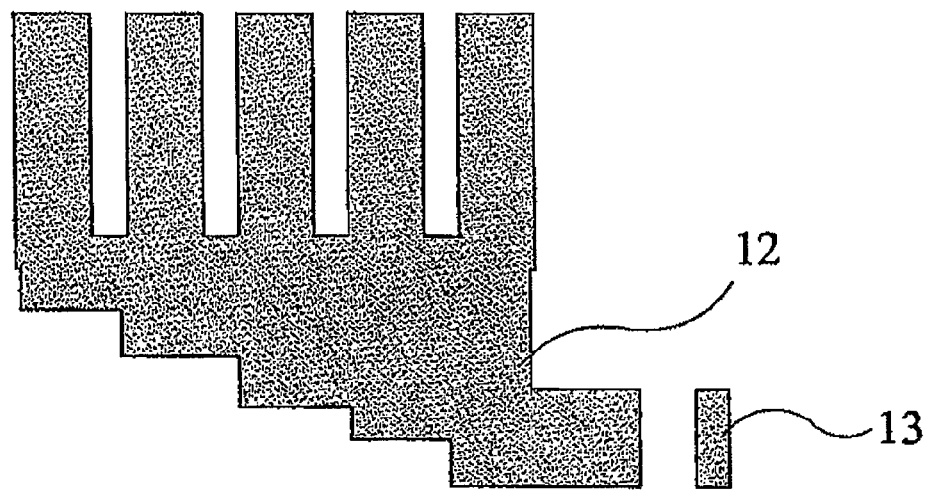
FIG. 8 is a diagrammatic plan view illustrating a light guide which may be used in a backlight of the type illustrated in FIG. 2 or FIG. 3.

In order to provide substantially uniform illumination across the area of illumination in the single-view mode of operation, the structure of a waveguide for a feed in portion interfacing with the light source may be arranged as appropriate. An example of a stepped structure to achieve substantially uniform illumination is illustrated in FIG. 8.

Figure 9:
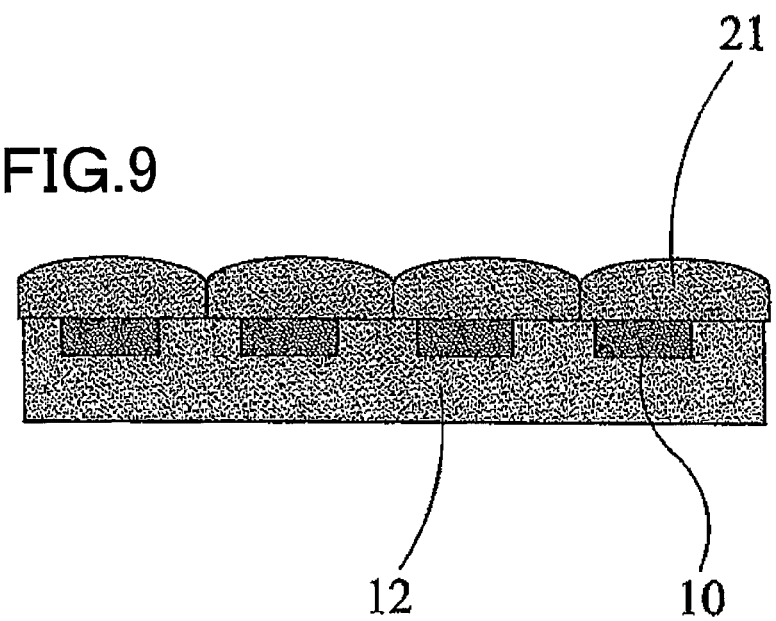
FIG. 9 is a diagrammatic side view of another backlight which may be used in displays constituting embodiments of the invention.

In order to improve performance in the multiple-view or 3D mode of operation, a lens array may be used in combination with the pattern of illumination produced by the backlight and may be of the type disclosed in EP0847208 and EP1078294. An example of this is illustrated in FIG. 9, in which a plastic lens array 21 is formed on and in alignment with the portion 10. Such an arrangement may be formed as a single molded device comprising a segmented waveguide and lens array.

Figure 10:
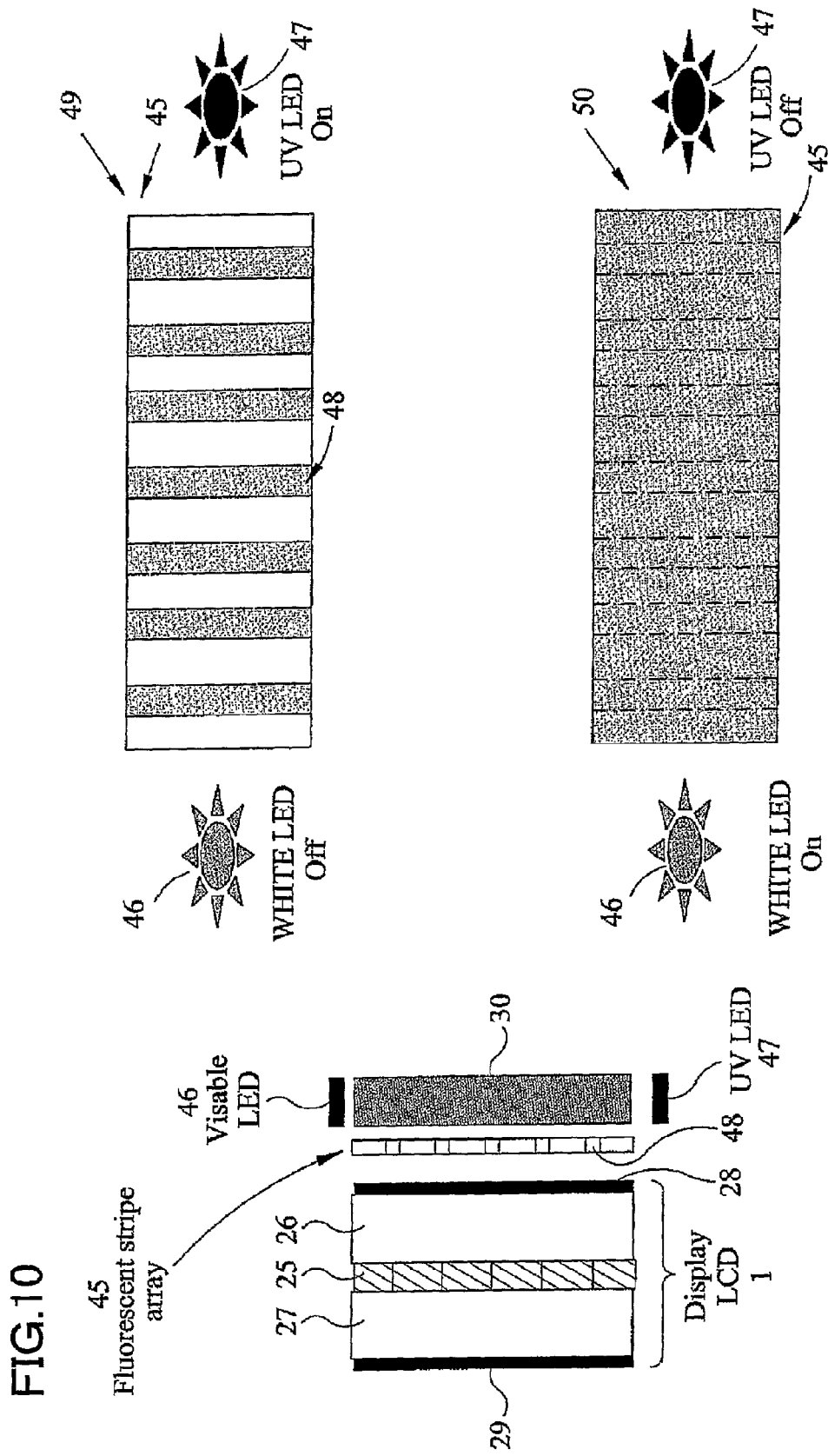
FIG. 10 shows diagrammatic cross-sectional and plan views of a display constituting another embodiment of the invention.

The display shown in FIG. 10 has an LCD 1 comprising a liquid crystal pixel layer 25 between substrates 26 and 27 with an input polarisation 28 and an output polarisation 29. Other elements, such as alignment layers, addressing arrangements and colour filtering, are not shown for the sake of clarity. The backlight includes a waveguide 30. A fluorescent stripe array 45 is formed on the output surface of the waveguide 30 or on a separate substrate immediately adjacent the output surface of the waveguide 30. A visible or white light LED 46 is shown along one input edge of the waveguide 30 whereas an ultraviolet (UV) LED 47 is shown along another input edge of the waveguide 30. The fluorescent stripe array 45 comprises relatively thin stripes, such as 48, of fluorescent material, which is transparent to visible light but which absorbs ultraviolet light and fluoresces in the visible spectrum. The stripes 48 are parallel to each other and evenly spaced.

As illustrated at 49, in the multiple-view or 3D mode of the display, the white LED 46 is switched off whereas the UV LED 47 is switched on. The stripes 48 thus emit visible light and, as with all of the spatially multiplexed displays described herein, each stripe cooperates with the pixelated structure of the LCD 1 and the spatially multiplexed arrangement of the views to provide independent images to different viewers or homologous stereoscopic views to one or more viewers.

In the single-view or 2D mode as illustrated at 50, the white LED 46 is switched on whereas the UV LED 47 is switched off. The light guide 30 operates in the conventional way to distribute light from the LED 46 substantially uniformly through the LCD 1.

Figure 11:
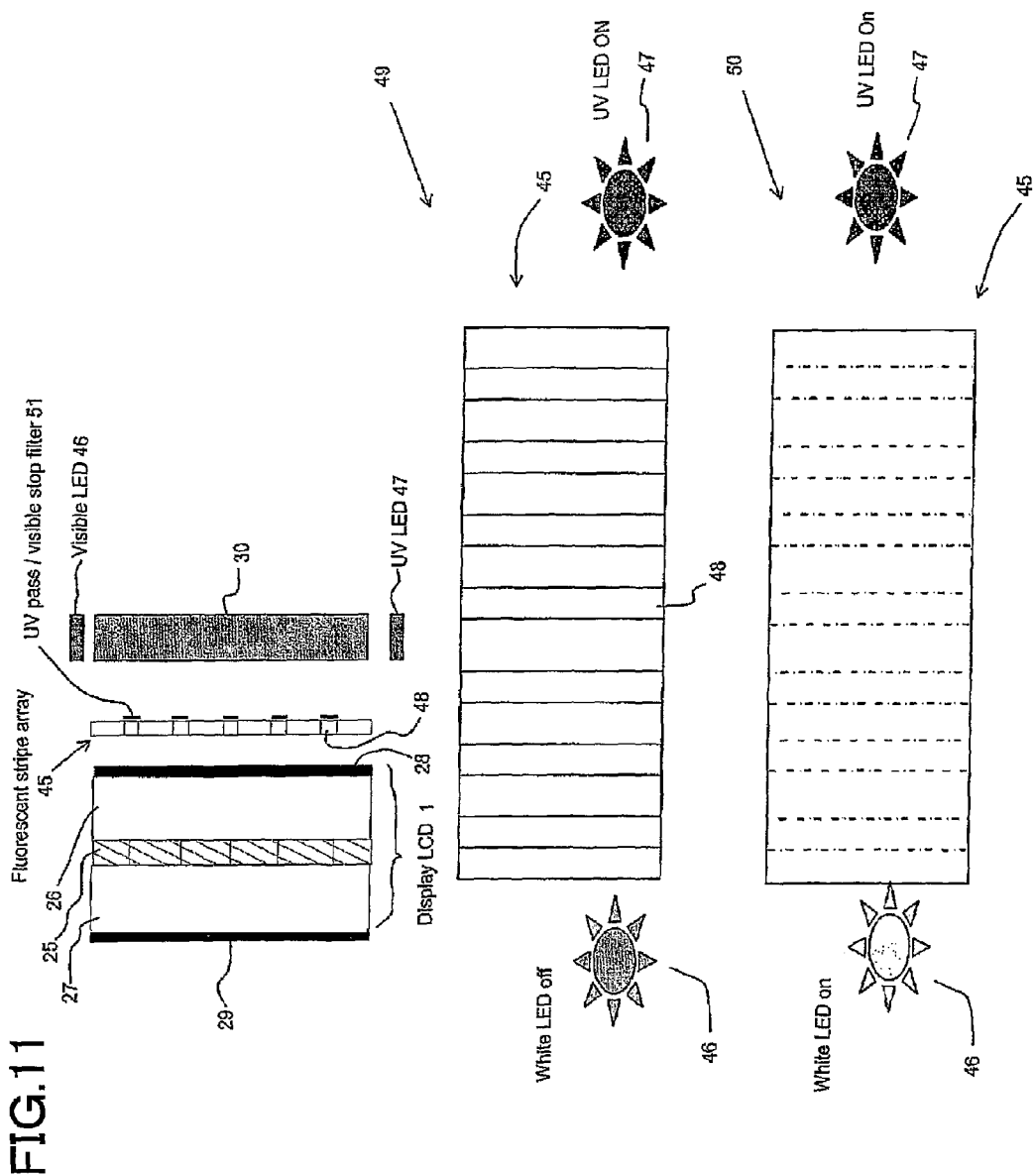
FIG. 11 shows diagrammatic cross-sectional and plan views of a display constituting another embodiment of the invention.

A further embodiment is shown in FIG. 11. The display of FIG. 11 is generally similar to that shown in FIG. 10, having an LCD 1 comprising a liquid crystal pixel layer 25 between substrates 26 and 27 with an input polarisation 28 and an output polarisation 29. Other elements, such as alignment layers, addressing arrangements and colour filtering, are not shown for the sake of clarity. The backlight includes a waveguide 30. A fluorescent stripe array 45 is formed on the output surface of the waveguide 30 or on a separate substrate immediately adjacent the output surface of the waveguide 30. A visible or white light LED 46 is shown along one input edge of the waveguide 30 whereas an ultraviolet (UV) LED 47 is shown along another input edge of the waveguide 30. The fluorescent stripe array 45 comprises relatively thin stripes, such as 48, of fluorescent material, which absorbs ultraviolet light and fluoresces in the visible spectrum. The stripes 48 are parallel to each other and evenly spaced.

The display shown in FIG. 11 differs in structure from the display shown in FIG. 10 by an additional patterned filter layer which provides an array of filter material 51 aligned with the fluorescent stripe array 45. The filter material 51 is adapted to transmit UV light from the UV LED 47, and also adapted to block visible light both from the white LED 46 and from the fluorescent stripe array 45 when fluorescing.

As illustrated at 49 of FIG. 11, in the multiple-view or 3D mode of the display, the white LED 46 is switched off whereas the UV LED 47 is switched on, as for the embodiment shown in FIG. 10. The filter material 51 allows UV light from the UV LED 47 to pass through to the fluorescent stripe array 45, causing the stripes 48 to emit visible light. As with all of the spatially multiplexed displays described hereinbefore, the illumination from each stripe cooperates with the pixelated structure of the LCD 1 and the spatially multiplexed arrangement of the views to provide independent images to different viewers or homologous stereoscopic views to one or more viewers.

When the phosphor in the stripes 48 is excited by UV from the UV LED 47 as described above, it emits visible light substantially equally in all directions, including backwards into the waveguide 30. This backward-transmitted white light is generally undesirable because it can re-emerge from the waveguide 30 anywhere from its output surface and provide illumination onto the LCD 1 that does not originate from the stripes 48. This stray light therefore leads to crosstalk in the multiple-view or 3D mode of operation. This problem is alleviated in the present embodiment by the presence of the filter material 51, aligned with the fluorescent stripe array 45, which ensures that any backward-transmitted visible light from the stripes 48 is absorbed or reflected before it can reach the waveguide 30.

Unlike the embodiment shown in FIG. 10, in the embodiment of FIG. 11 the single-view or 2D mode, as illustrated at 50, is achieved by switching both the white LED 46 and the UV LED 47. In view of the function provided by the filter material 51, white light from the white LED 46 is prevented from passing through to the fluorescent stripe regions 48 and beyond, but is allowed to pass through the regions therebetween, while UV light from the UV LED 47 is allowed to pass though the filter material 51 to the fluorescent stripe regions 48 to produce visible light from those regions due to fluorescence. This results in a uniform illumination across the whole of the backlight 2.

A further enhancement would be to provide a further filter layer covering the whole output surface of the backlight including fluorescent stripe array 45, with the further filter layer having the function of blocking UV light (e.g. from the UV LED 47 through the regions between the fluorescent strip regions 48, or excess UV light from the UV LED 47 not absorbed by the fluorescent stripe regions 48), but transmitting white light.

The fluorescent stripes 48 in the FIG. 10 embodiment are described above as being transparent to visible light so that, in the single-view or 2D mode of operation, white light from the white LED 46 can provide illumination across the whole output surface, with the UV LED 47 being off and therefore providing no fluorescence of the stripes 48. Alternatively, the fluorescent stripes 48 in FIG. 10 may be formed to be substantially opaque to visible light, with the single-view or 2D mode of operation being achieved by turning on both the white LED 46 and the UV LED 47, so that visible light is produced from the stripes by fluorescence rather than transmission. In the FIG. 11 embodiment the fluorescent stripes 48 can be formed from material that is either visible or opaque in the visible spectrum; the presence of the filter material 51 acts anyway to block visible light in these stripe regions.

The fluorescent stripes 48 in FIGS. 10 and 11 may be made of any suitable material, such as metal-ligand complexes and inorganic phosphors such as those used in plasma displays and cold cathode fluorescent tubes. Efficiency of illumination may be improved by dispersing the fluorescent material in a scattering medium, such as a polymer matrix.

Figure 12:
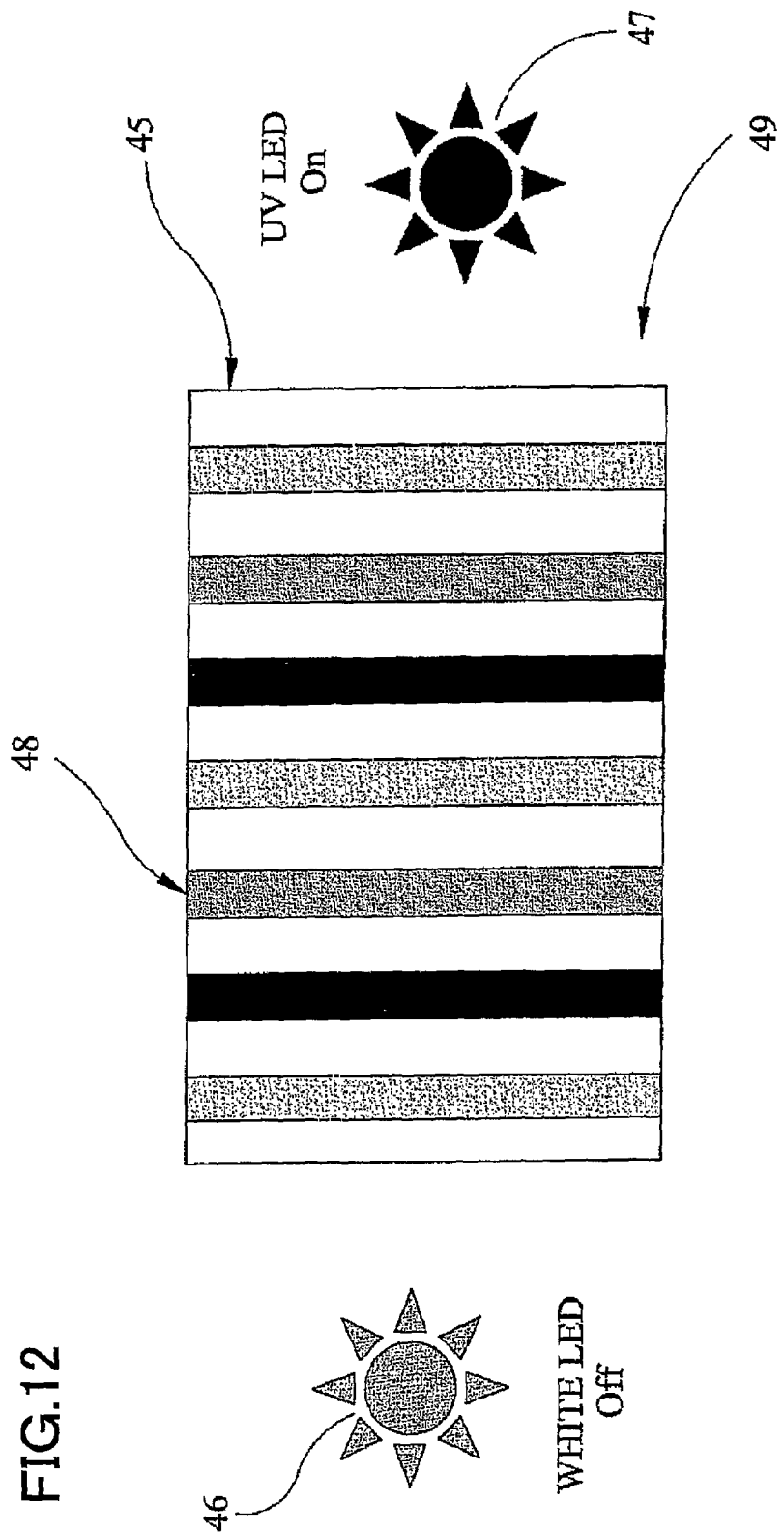
FIG. 12 is a diagrammatic plan view of a modified form of backlight which may be used in the display of FIG. 10 or 11.

The fluorescent stripes 48 of FIGS. 10 and 11 may be arranged to emit substantially white light and such an arrangement may be used for monochrome or black and white displays or with LCDs 1 including colour filtering for providing full-colour displays. Alternatively, the stripes 48 may be arranged as repeating groups of different colours as illustrated by different shading densities in FIG. 12. Each stripe may emit a single colour component, such as red, green or blue and materials suitable for this include terbium (Th), iridium (Ir), and europium (Eu) metal complexes. As an alternative, each fluorescent stripe may be arranged to emit two of the primary colours, for example as disclosed in GB0320367.6, in order to improve viewing freedom.

Figure 13:
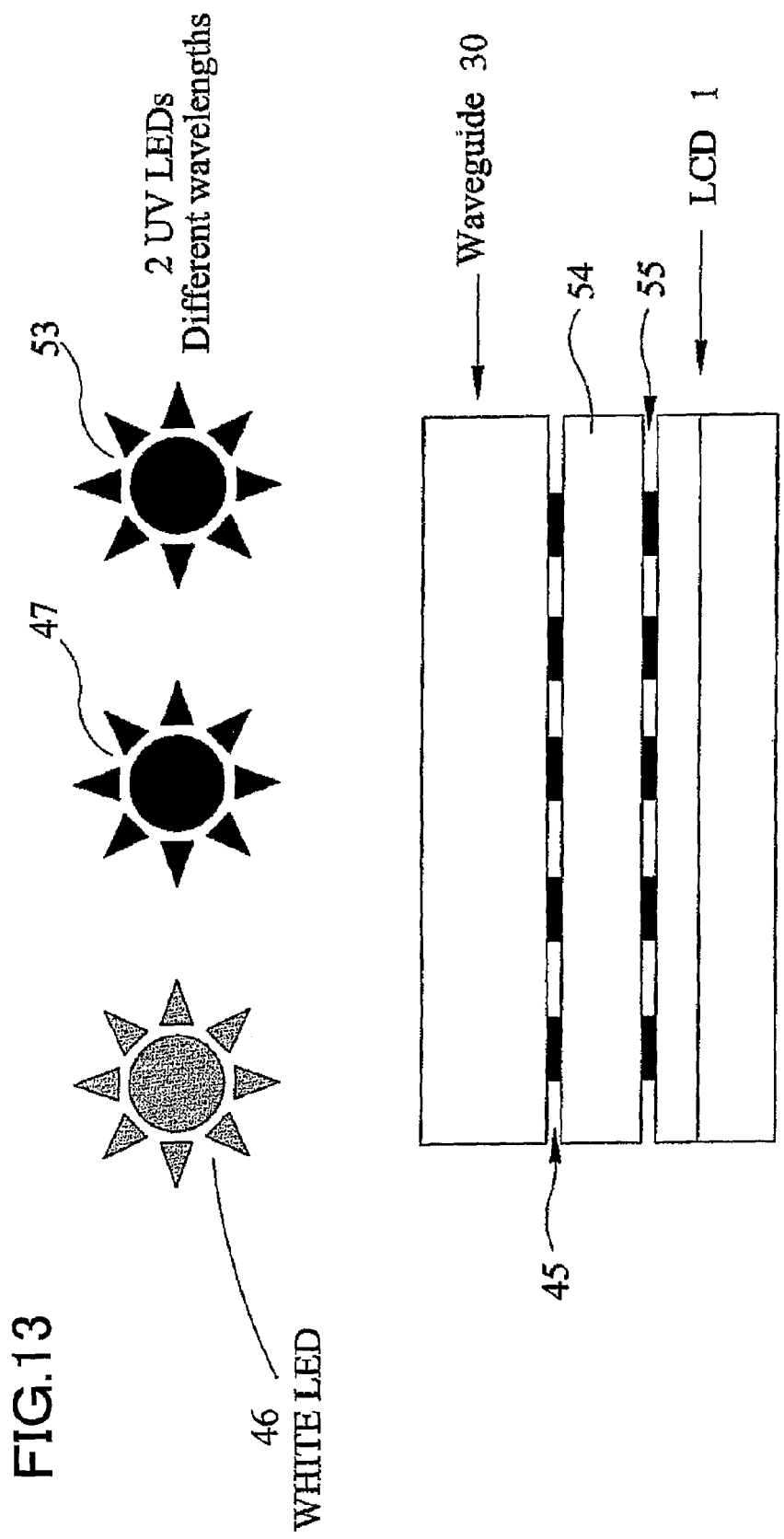
FIG. 13 is a diagrammatic cross-sectional view of a display constituting a further embodiment of the invention.

In the display shown in FIG. 13, in addition to the white LED 46 and the UV LED 47, a further UV LED 53 is provided with the LEDs 47 and 53 emitting ultraviolet light at different wavelengths. The fluorescent stripe array 45 comprises fluorescent material which responds only to the wavelengths emitted by the LED 47. A transparent spacer 54, for example forming a substrate for other components or elements, is disposed between the array 45 and the LCD 1 and carries, on its surface nearer the LCD 1 another fluorescent stripe array 55. The fluorescent stripes of the array 55 respond only to wavelengths emitted by the LED 53.

The angular separation between views in the multiple-view mode is determined partly by the distance between the light-emitting lines constituting the light source in this mode and the pixel plane of the LCD 1. The arrangement shown in FIG. 13 allows two different angular separations to be provided. In particular, when the LED 47 is illuminated so that the fluorescent stripes of the array 45 emit light, a relatively small angular separation between views is provided and this may, for example, provide a 3D autostereoscopic mode of operation. Conversely, when the LED 53 is switched on so that the fluorescent stripes of the array 55 emit light, a relatively wide angular separation is provided and this may be more useful when the display is being used to supply views independently to two or more different viewers.

Figure 14:
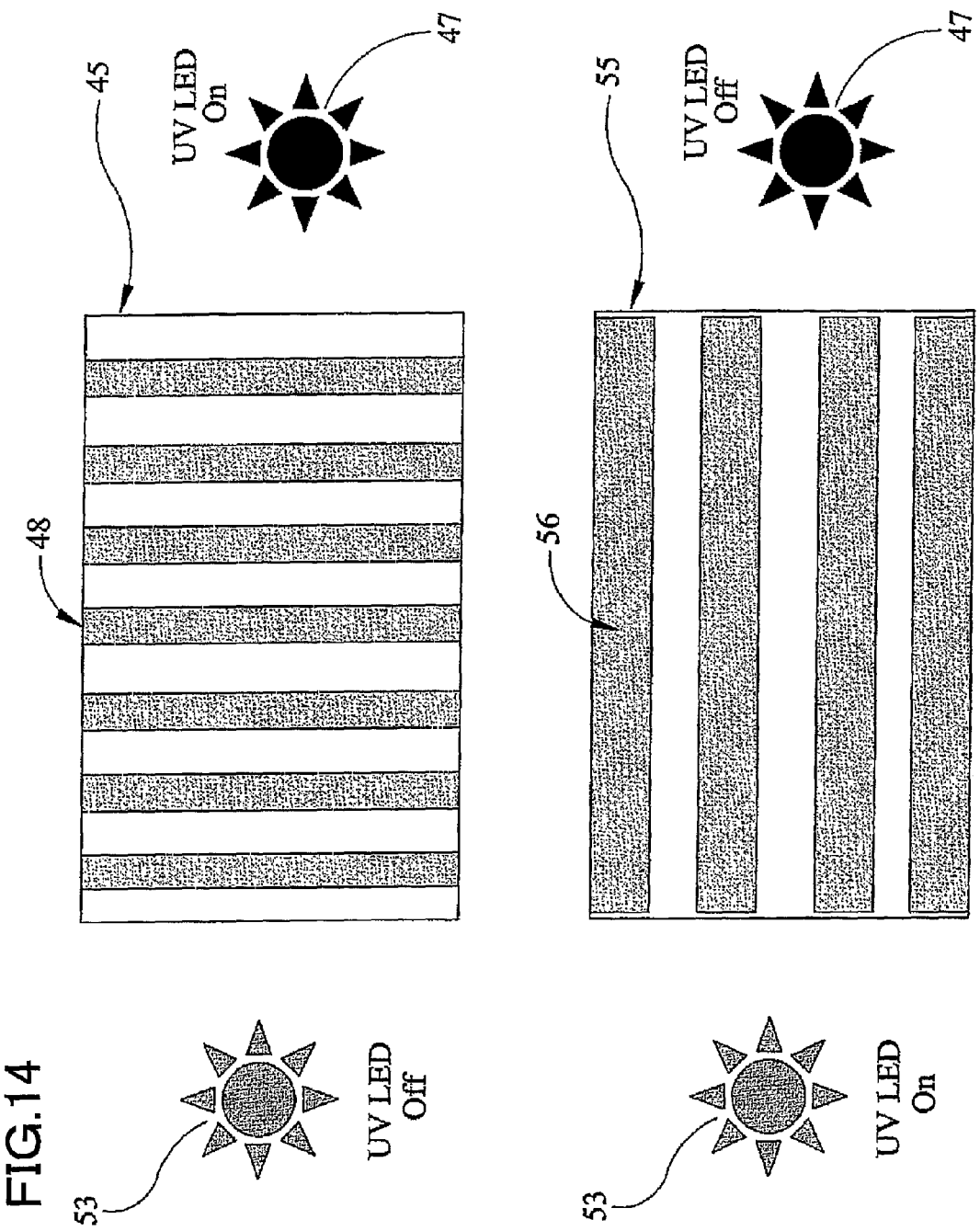
FIG. 14 shows diagrammatic plan views of a backlight for use in a display of the type illustrated in FIG. 10 or 11.

FIG. 14 illustrates another embodiment which makes use of two UV LEDs 47 and 53 emitting ultraviolet light at different wavelengths and two fluorescent stripe arrays 45 and 55 which, in this embodiment, may or may not be separated by a substrate such as 54 shown in FIG. 13 and may be in the same relative positions or with their relative positions reversed. The fluorescent stripes 48 of the array 45 are oriented as illustrated hereinbefore so as to be parallel to the shorter edges of the rectangular display and hence so as to be vertical when the display is oriented in the landscape configuration with the shorter edges being vertical. Thus, when the LED 47 is illuminated, a multiple-view landscape format display is provided.

The fluorescent stripes 56 of the array 55 extend orthogonally to the stripes 48 of the array 45 and are hence parallel to the longer edges of the display. The display may therefore be oriented in the portrait format with the longer edges being vertical and, when the LED 53 is illuminated, the arrangement of the stripes 56 again provides horizontal parallax so as to permit a multiple-view mode in the portrait format of the display.

In the displays described hereinbefore, it has been assumed that the different views in the multiple-view mode are displayed in a spatially multiplexed manner by the LCD 1. In particular, each light-emitting strip of the backlight is associated with a group of vertical image slices taken from the different images and this structure is repeated horizontally or laterally across the display. For example, the pixels of the LCD 1 may be arranged as columns with repeating groups where each column in each group displays a vertical slice or strip of an image. Displays of this type are well known and the spatial multiplexing format will not therefore be described further.

In the multiple-view mode, the number of pixels of the LCD 1 available to display each image is equal to the total number of pixels of the LCD 1 divided by the number of images which are being simultaneously displayed. Thus, as the number of images increases, the spatial resolution of each image is reduced, as is the image brightness for a given backlight output.

Another technique for displaying a plurality of images on the same physical display is known as temporal multiplexing. In this type of arrangement, the whole display area is used to display each image and the images in a multiple-view mode are displayed one at a time in a repeating sequence with a sufficiently rapid rate to avoid visible flicker. Such an arrangement allows each image to be displayed with the full spatial resolution of the display but requires a display which is capable of a relatively high refresh or frame rate. Again, for a given backlight output, each image is displayed with reduced brightness compared with the single-view mode.

Displays are also known in which spatial and temporal multiplexing techniques are combined. For example, in each display frame, two images may be displayed with spatial multiplexing and, for example, four different images may be displayed by changing the images in alternate frames and directing the images to different viewing regions in alternate frames.

Figure 15:
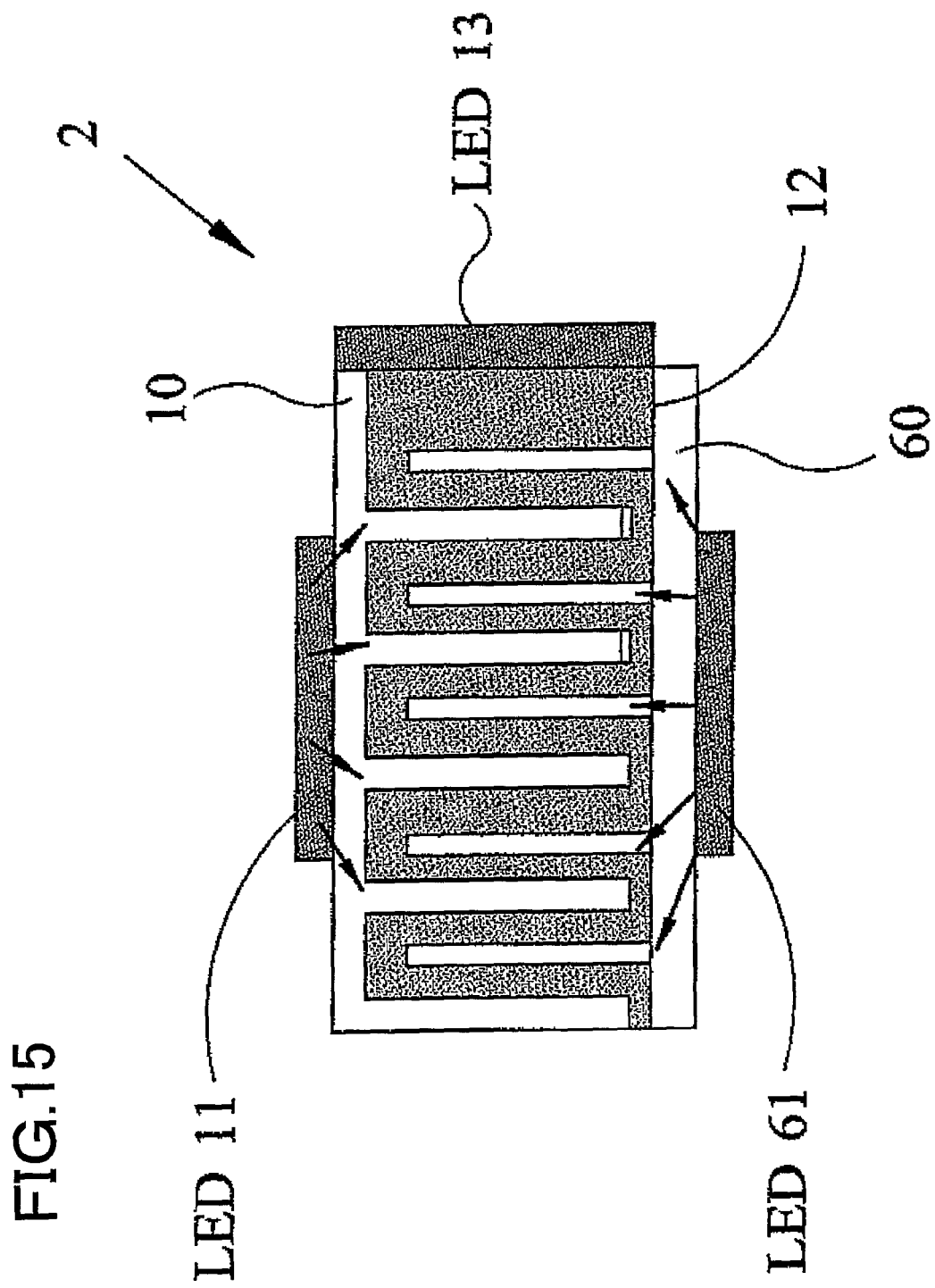
FIG. 15 is a diagrammatic plan view of another backlight which may be used in a display constituting an embodiment of the invention to provide temporal as well as spatial multiplexing.

FIG. 15 illustrates a backlight which is suitable for operating in the mixed spatial and temporal multiplexing mode. The backlight is of the same general type as illustrated in FIG. 2 but, in addition to the LED 11 and the light guide 10, comprises another light guide 60 supplied by an LED 61.

In the single-view mode, all of the LEDs 11, 13 and 61 are illuminated so that the whole output surface of the backlight 2 supplies light substantially evenly across the display area of the LCD 1. In the multiple-view mode, the LEDs 11 and 61 are illuminated alternately and in synchronism with the frame refreshing of the LCD 1, whereas the LED 13 is switched off. The light guides 10 and 60 thus alternately form arrays of sources which are laterally shifted with respect to each other so as to define different viewing regions during consecutive frame periods.

Figure 16:
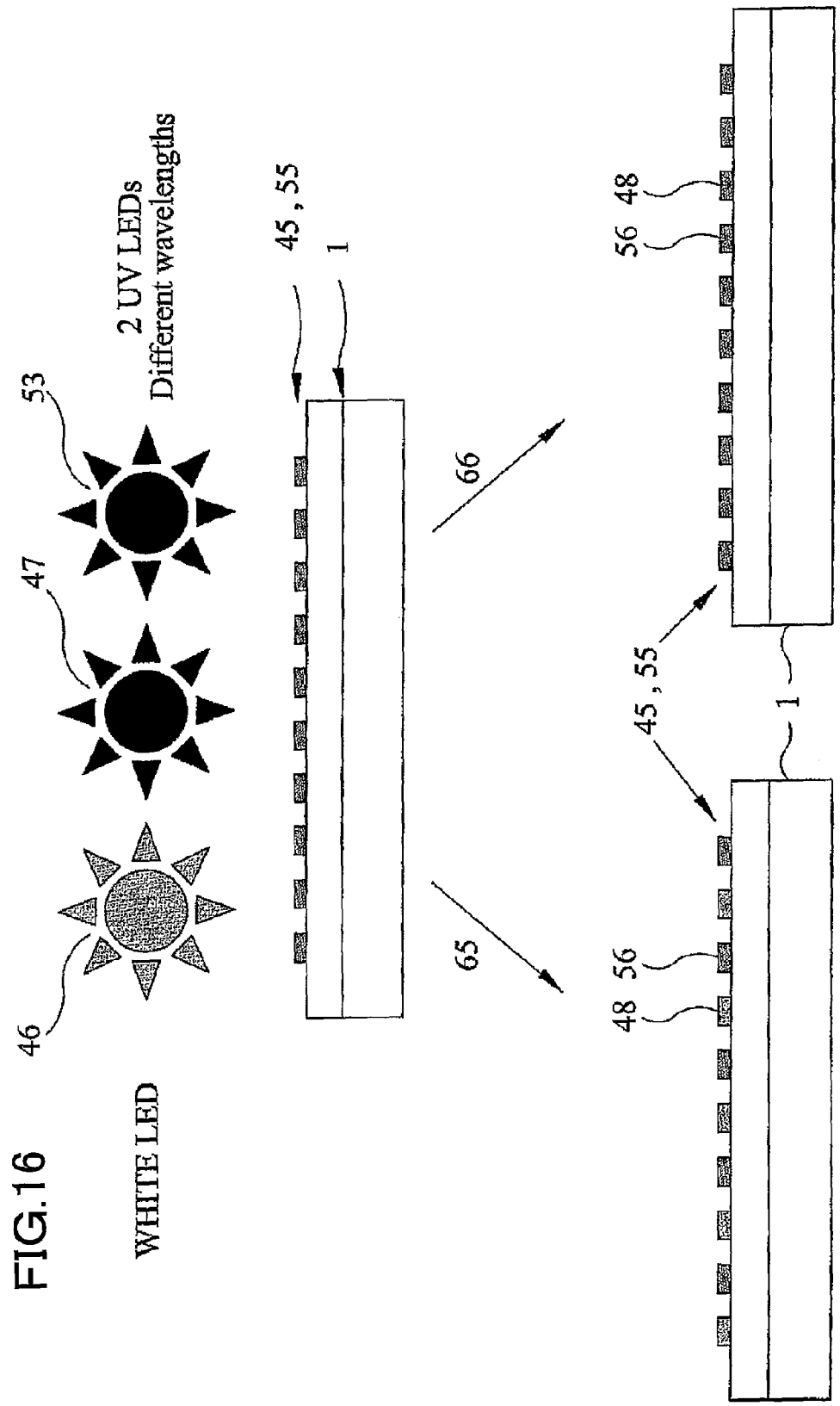
FIG. 16 shows diagrammatic cross-sectional views of another type of backlight for providing temporal and spatial multiplexing.

Another arrangement suitable for temporal and spatial multiplexing is illustrated in FIG. 16 and makes use of the UV LEDs 47 and 53 of different wavelengths and the arrays 44 and 45 of different fluorescent material stripes responding to the different wavelengths. In this case, the arrays 45 and 55 are coplanar and interdigitated such that the stripes of the array 45 alternate laterally with the stripes 56 of the array 55.

Operation in the single-view mode is as described hereinbefore. In the multiple-view mode, the LEDs 47 and 53 are switched on in alternate frame periods of the display. Thus, in a first of each pair of consecutive frame periods as illustrated at 65, the LED 47 is switched on whereas the LED 53 is switched off. The stripes 48 of the array 45 emit light whereas the stripes 56 of the array 55 do not. In this example, subsections of four views are displayed during this frame period in a spatially multiplexed manner by the LCD 1.

In the second of each pair of frames as illustrated at 66, the LED 47 is switched off whereas the LED 53 is switched on so that the stripes 56 of the array 55 emit light whereas the stripes 48 of the array 45 do not. Different subsections of the four views are displayed by the LCD 1 during this frame. By the use of the combination of spatial and temporal multiplexing, four views are thus displayed in four different viewing regions and the spatial resolution of each of the four images is doubled by the use of temporal multiplexing. Such a mode of operation may be used to display independent views to different viewers or to provide a 3D autostereoscopic display.

Another known type of 3D autostereoscopic display tracks the position of an observer and moves the viewing regions accordingly. For example, such a display may include a video camera or other sensor arrangement for determining the position of the head of the observer. The position is then used to control the positions to which left eye and right eye views are projected so that the observer has some freedom of movement while still viewing the display orthoscopically. This may be achieved by translating the position of the light source, for example laterally, with respect to the pixels of an LCD. The relative movement may be provided by relative physical movement or may be simulated by switching on and off individual light sources in different positions.

Figure 17:
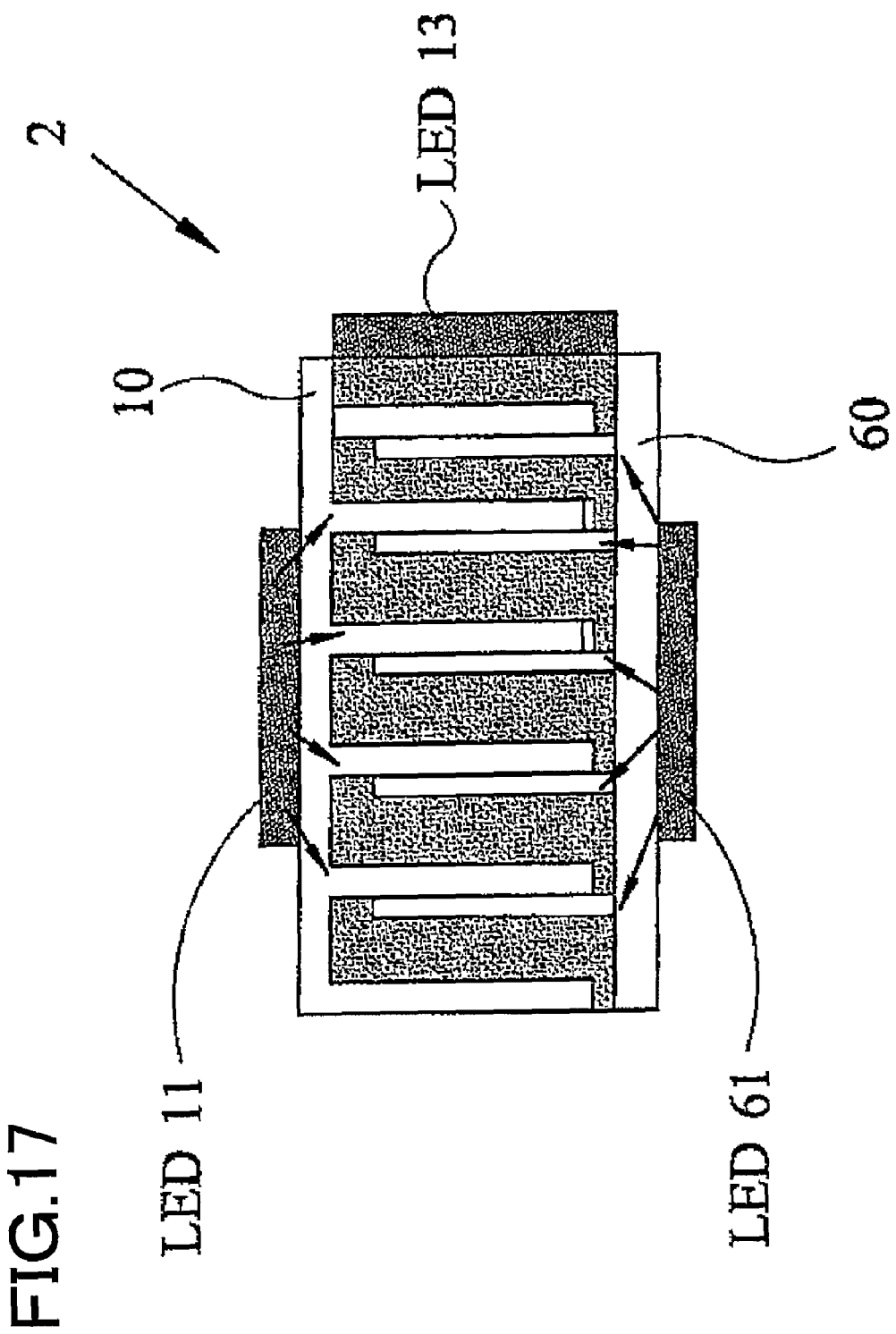
FIG. 17 is a diagrammatic plan view of another backlight which may be used in a display constituting an embodiment of the invention to provide observer tracking.

FIG. 17 illustrates a backlight which is suitable for providing some degree of observer tracking ability for a multiple view or 3D display. The backlight 2 of FIG. 17 is similar to that shown in FIG. 15 in that it comprises light guides 10 and 60 which are individually illuminatable by LEDs 11 and 61. A further LED 13 is similarly provided and all three LEDs are illuminated in the single-view mode so that the whole output surface of the backlight 2 supplies light substantially evenly across the display area of the LCD 1.

The light guides 10 and 60 are arranged so that the individual line portions are substantially adjacent each other. In the multiple-view mode, either or both of the LEDs 11 and 61 may be illuminated in accordance with the position of the head of the observer as determined by a suitable observer tracking system (not shown). Such an arrangement allows a degree of lateral tracking of an observer. In order to provide greater lateral freedom, more than two light guides 10 and 60 with respective LEDs may be provided.

When the observer is in the right hand most viewing region, the LED 61 is illuminated so that the light guide 60 forms a set of light lines which direct light encoding one or more views towards the observer. As the observer moves to the left, the other LED 11 is illuminated so as to direct light encoding the view or views to a contiguous viewing region. As the observer moves further to the left and out of the right hand most viewing region, the LED 61 is switched off so that only the light lines of the light guide 10 direct light towards the observer.

Although only one of the LEDs 11 and 61 at a time may be switched on, undesirable visual artefacts may occur when the observer is moving from one viewing region to the next viewing region. By switching on both LEDs 11 and 61 when the observer is in such a position, such artefacts may be avoided or substantially reduced. Also, in order to avoid or reduce such artefacts, the adjacent light lines of the guides 10 and 60 should be laterally contiguous or as close together as possible. This avoids or reduces the effect of a gap between the viewing regions.

Figure 18:
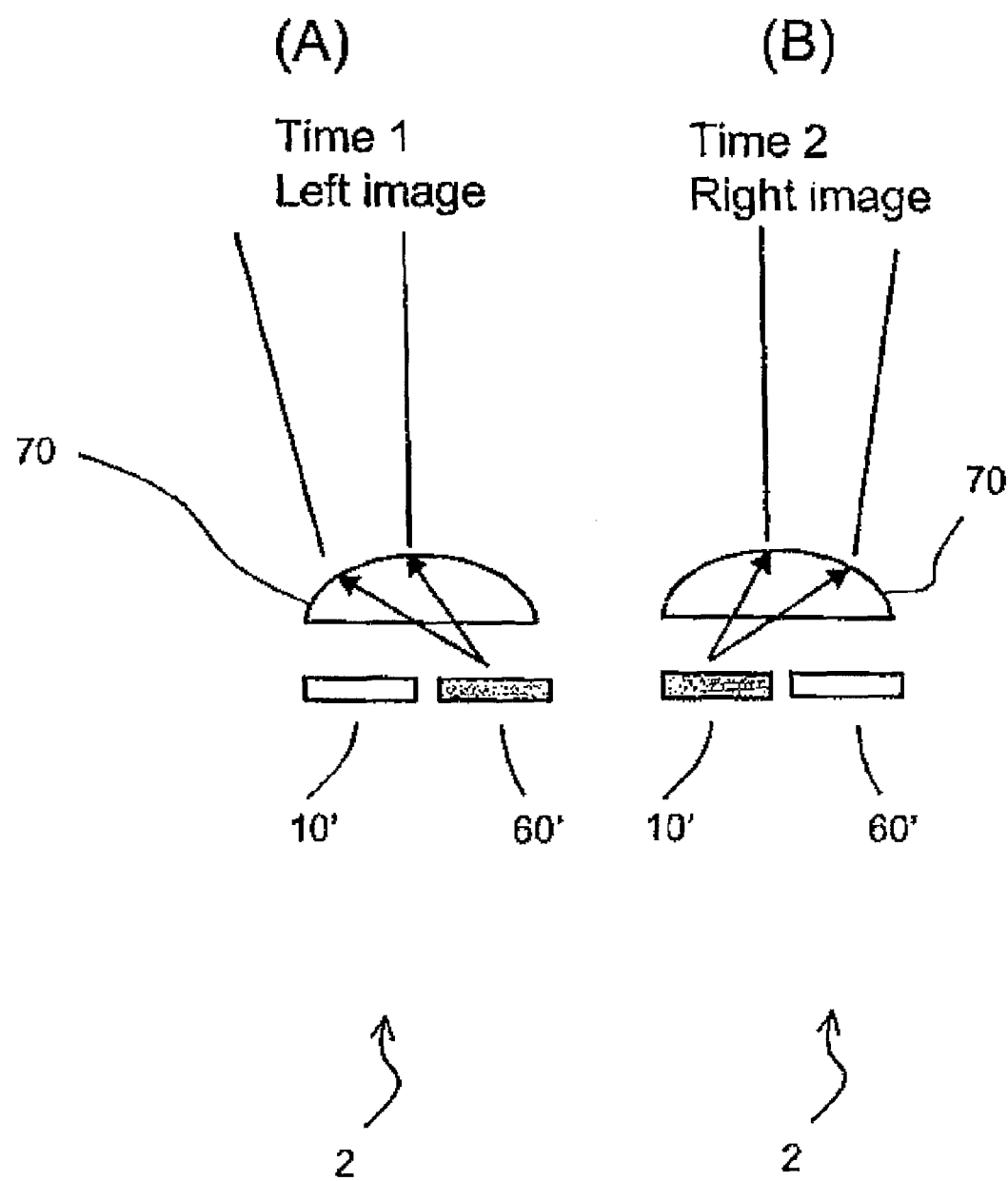
FIG. 18 illustrates a further embodiment of the invention in which a segmented backlight is used in conjunction with a lens array.
Figure 19:
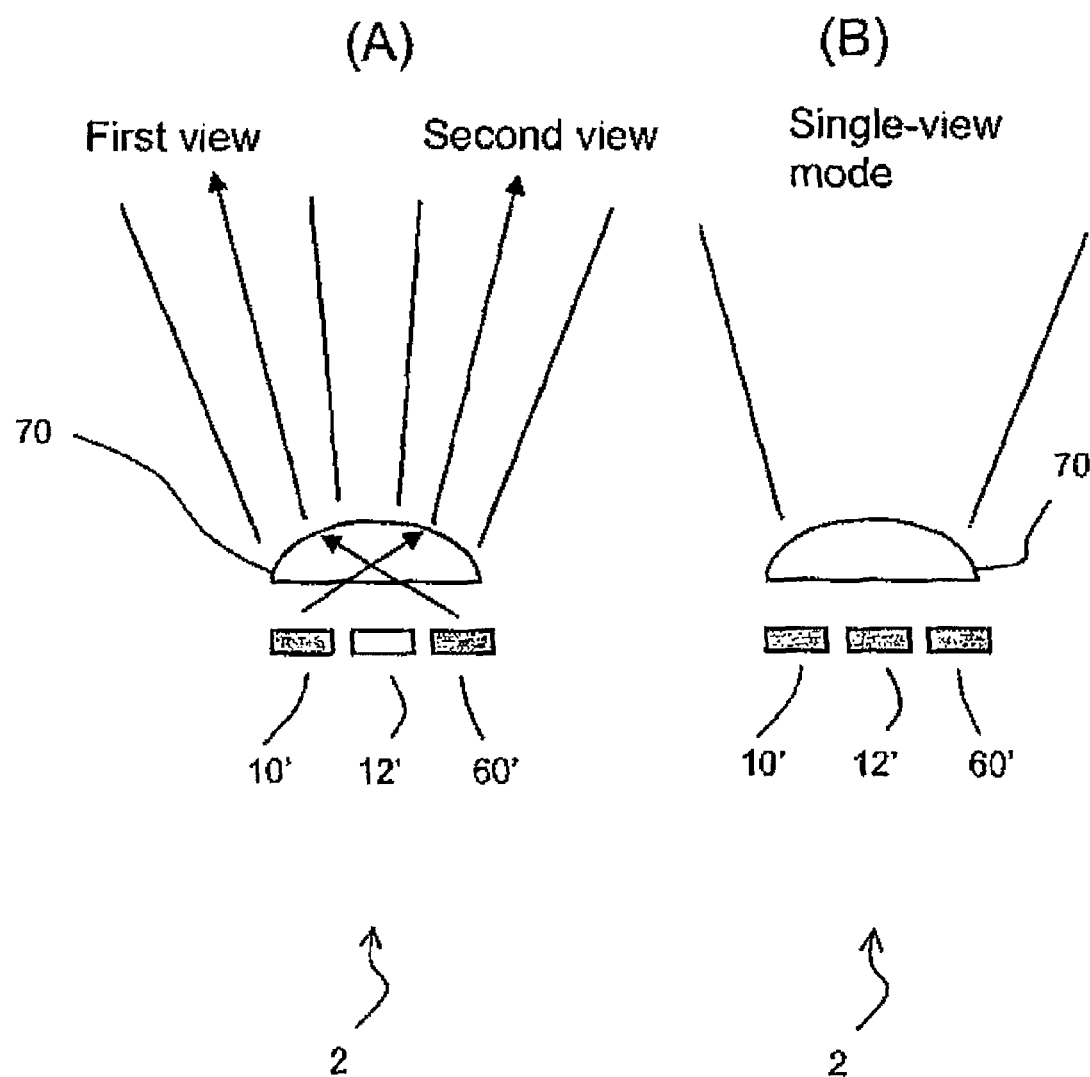
FIG. 19 illustrates a yet further embodiment of the invention in which a segmented backlight is used in conjunction with a lens array.

FIGS. 18 and 19 illustrate further embodiments of the invention in which the segmented backlight 2 is used in conjunction with a lens array 70.

In the FIG. 18 embodiment, the backlight 2 is segmented using a technique as suggested in any of the above-described embodiments into a plurality of regions 10$f$ and 60$f$ repeating as a group across the backlight 2. The regions 10$f$ and 60$f$ correspond generally in function to the regions 10 and 60 described above, although operation of the FIG. 18 embodiment is different to previous embodiments as will be described below.

An array of lenses 70 is provided in the FIG. 18 embodiment, with each lens of the array 70 being arranged to receive light from a group of regions 10$f$ and 60$f$. Each such region 10$f$ and 60$f$ in a group is arranged to illuminate only part of its associated lens, and this spatial restriction results in an angular restriction in the output light, such that a cone of light is generated within a predetermined angular range in a predetermined direction. In previous embodiments, the light emission was localised to certain regions but was broadly lambertian in angular distribution.

The display operates in the multiple-view mode by temporal multiplexing, such that the regions 10$f$ and 60$f$ are illuminated alternately and in synchronism with the frame refreshing of the LCD 1. This is illustrated in FIGS. 18A and 18B, showing consecutive time frames. In this embodiment, the whole display area is used to display each image and the images in the multiple-view mode are displayed one at a time in a repeating sequence with a sufficiently rapid rate to avoid visible flicker.

Unlike the FIG. 15 embodiment, the directional nature of the illumination results from a cooperation between the segmentation of the backlight 2 and the lens array 70, rather than from a cooperation between the backlight segmentation and the LCD pixel structure, so that the effect is independent of the LCD 1. For each time frame, a single viewing region is created, alternating between two locations from one frame to the next.

In the single-view mode, both of the regions 10$f$ and 60$f$ are illuminated so that the whole output surface of the backlight 2 supplies light substantially evenly across the display area of the LCD 1.

The embodiment shown in FIG. 19 is similar to that shown in FIG. 18, differing in that an additional region 12$f$ is provided in each group of regions disposed between regions 10$f$ and 60$f$. In the FIG. 19 embodiment, therefore, the backlight 2 is segmented into a plurality of regions 10$f$, 12$f$ and 60$f$ repeating as a group across the backlight 2. An array of lenses 70 is also provided, with each lens of the array 70 being arranged to receive light from a group of regions 10$f$, 12$f$ and 60$f$. The regions 10$f$, 12$f$ and 60$f$ correspond generally in function to the regions 10, 12 and 60 described above, although operation of the FIG. 19 embodiment is different to previous embodiments as will be described below.

As illustrated in FIG. 19A, the display operates in the multiple-view mode by illuminating both regions 10$f$ and 60$f$, either simultaneously to provide both views at once, or time-sequentially to provide the different views in alternate time frames. In both cases, the LCD 1 is used to display a single image, so that in the former case the same image is displayed to both views while in the latter case the images for each view can be different by varying the image on the LCD 1 from one time frame to the next. Again, the directional nature of the illumination results from a cooperation between the segmentation of the backlight 2 and the lens array 70, rather than from a cooperation between the backlight segmentation and the LCD pixel structure, so that the effect is independent of the LCD 1.

In the single-view mode, all of the regions 10$f$, 12$f$ and 60$f$ are illuminated so that the whole output surface of the backlight 2 supplies light substantially evenly across the display area of the LCD 1, as illustrated in FIG. 19B, with the pixels of the LCD 1 providing a single image. The regions 12$f$ of FIG. 19 could also be omitted, with the single-view mode being achieved by illuminating regions 10$f$ and 60$f$.

In another embodiment, based on the FIGS. 18 and 19 embodiments, the backlight 2 and LCD 1 could be adapted and arranged such that light deriving from regions 10$f$ and 60$f$ illuminate alternate strips of pixels of the LCD 1, the alternate strips of pixels being associated with different respective images (for example, left/right images in the 3D mode of operation or two independent images in the multiple-view mode). In this way, different images can be provided simultaneously to the two views by spatial multiplexing.

Figure 20:
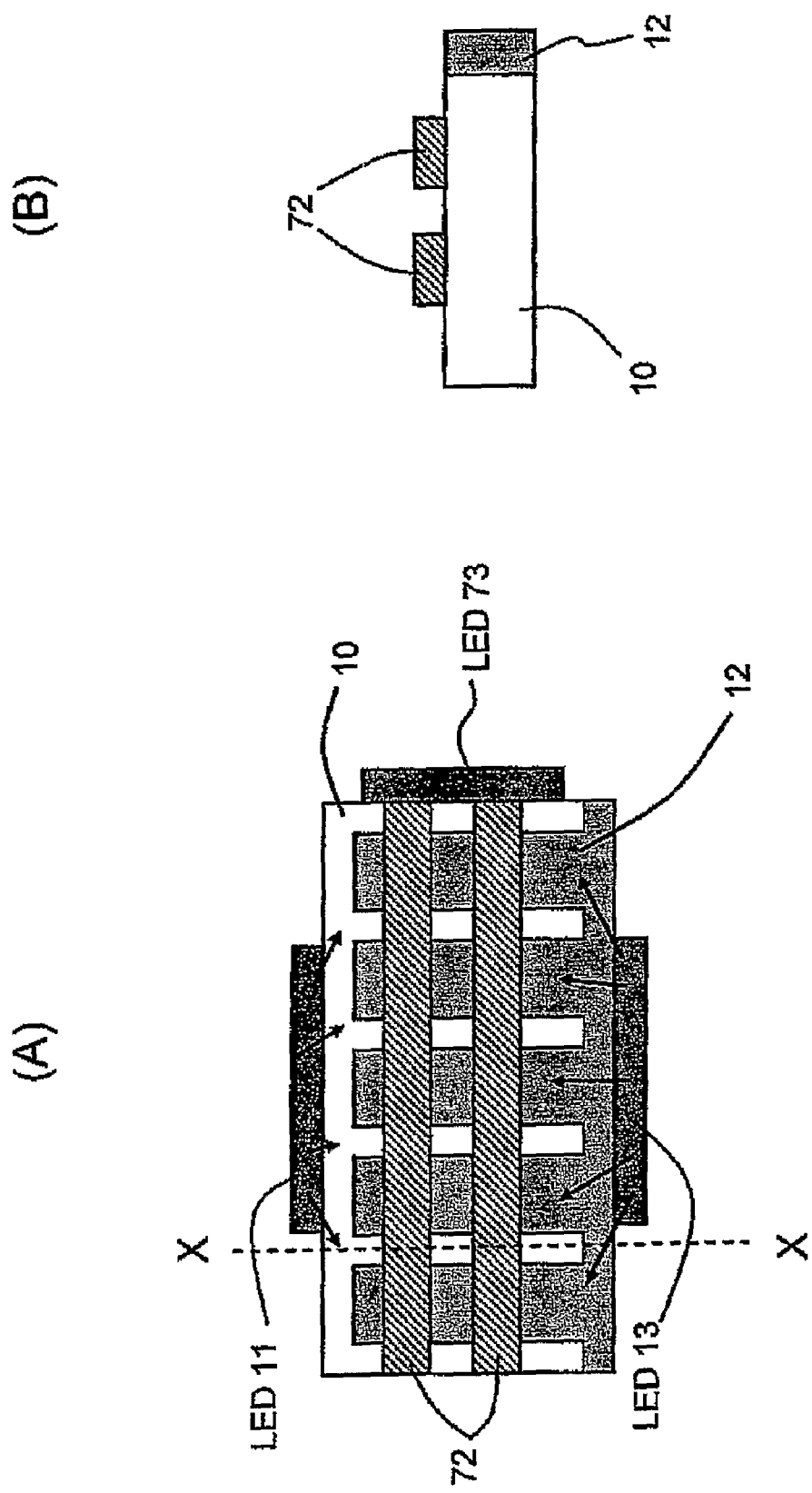
FIG. 20 shows diagrammatic plan and side views of another backlight for use in displays constituting embodiments of the invention.

Although in the FIG. 14 embodiment described above, orthogonal stripes of fluorescent material provide two differently-orientated multiple-view or 3D viewing modes, the principle associated with the FIG. 14 embodiment can be applied to any of the light guide embodiments of the present invention described hereinbefore. For example, FIG. 20 illustrates a modification to the light guide embodiment of FIG. 2, in which an additional white LED 73 provides light into additional light-guiding stripes 72 disposed on top of the light-guiding portions 10 and 12 described above. A plan view of the modified backlight is illustrated in FIG. 20A, while a side cross-sectional view through X-X of FIG. 20A is illustrated in FIG. 20B.

The stripes of the light-guiding portion 10 are oriented as described above so as to be parallel to the shorter edges of the rectangular display and hence so as to be vertical when the display is oriented in the landscape configuration with the shorter edges being vertical. Thus, when the LED 11 is illuminated, a multiple-view landscape format display is provided.

The additional light-guiding stripes 72 extend orthogonally to the stripes of the light-guiding portion 10 and are hence parallel to the longer edges of the display. The display may therefore be oriented in the portrait format with the longer edges being vertical and, when the LED 73 is illuminated, the arrangement of the stripes 72 again provides horizontal parallax so as to permit a multiple-view mode in the portrait format of the display.

In this modification, it may be advantageous to arrange for the same 3D viewing distance in both landscape and portrait modes. This may be achieved, for example, by selecting a relationship between the pitch of stripes 10 and of stripes 72 according to the method disclosed in our co-pending United Kingdom Patent Application No. 0414496.0.

In the displays described hereinbefore, it has been assumed that the whole of the display area will operate either in the single-view mode or in the multiple-view mode. However, it is possible for the mode of operation of different regions of the display to be controlled independently of each other, for example so that one part of the display operates in the single-view or 2D mode whereas another part of the display operates in the multiple-view or 3D mode. For example, this may be achieved by dividing up the backlight into different regions whose modes of operation can be controlled independently of each other and by displaying the appropriate images on the LCD.

The invention claimed is:

1. A display comprising a backlight and a spatial light modulator for modulating light from the backlight, the backlight having a light-output surface, at least one portion of which comprises a plurality of first regions arranged to output light in a multiple-view mode of the display, the whole of the at least one portion being arranged to output light in a single-view mode of the display, wherein dividers dividing the at least one portion and the plurality of first regions are integrally part of the backlight.

2. A display as claimed in claim 1, in which the at least one portion comprises a plurality of second regions arranged to output light alternately with the first regions for temporal multiplexing of views in the multiple-view mode.

3. A display as claimed in claim 1, in which the at least one portion comprises a plurality of second regions with the first and second regions being independently controllable to emit light for observer tracking in the multiple-view mode.

4. A display comprising a backlight and a spatial light modulator for modulating light from the backlight, the backlight having a light-output surface, at least one portion of which comprises a plurality of first regions arranged to output light in a multiple-view mode of the display, the whole of the at least one portion being arranged to output light in a single-view mode of the display in which the first regions comprise first light-redirecting elements adapted to redirect light travelling in a first direction but not a second direction towards the spatial light modulator, and in which a remainder of the at least one portion comprises second light-redirecting elements adapted to redirect light travelling in the second direction but not the first direction towards the spatial light modulator.

5. A display as claimed in claim 4, in which the first and second directions are substantially orthogonal.

6. A display as claimed in claim 4, in which the backlight comprises: a light guide on which the light-redirecting elements are disposed, a first light source for supplying light to the light guide in the first direction, and a second light source for supplying light to the light guide in the second direction.

7. A display comprising a backlight and a spatial light modulator for modulating light from the backlight, the backlight having a light-output surface, at least one portion of which comprises a plurality of first regions arranged to output light in a multiple-view mode of the display, the whole of the at least one portion being arranged to output light in a single-view mode of the display in which the backlight comprises: a first light guide having the first regions; a first visible light source for supplying light to the first light guide; a second light guide having a remainder of the at least one portion; and a second visible light source for supplying light to the second light guide, wherein the first light guide has a higher refractive index than the second light guide.

8. A display as claimed in claim 7, in which the first light guide is disposed on an output surface of the second light guide.

9. A display as claimed in claim 7, in which the first and second light sources are arranged to supply light in first and second directions respectively.

10. A display as claimed in claim 7, in which first and second light-redirecting elements are provided on a surface of each of the first and second light guides respectively.

11. A display as claimed in claim 7, in which each of the first and second light guides comprises at least one waveguide with a stepped structure.

12. A display as claimed in claim 7, in which each of the first and second light guides comprises a plurality of optical fibres.

13. A display as claimed in claim 7, in which the first and second light guides are separated from each other by a material of lower refractive index.

14. A display as claimed in claim 13, in which the material of lower refractive index is air.

15. A display as claimed in claim 7, in which non-input and non-output surfaces of the first and second waveguides are at least partially covered by a non-transmissive material.

16. A display as claimed in claim 15, in which the non-transmissive material is reflective.

17. A display comprising a backlight and a spatial light modulator for modulating light from the backlight, the backlight having a light-output surface, at least one portion of which comprises a plurality of first regions arranged to output light in a multiple-view mode of the display, the whole of the at least one portion being arranged to output light in a single-view mode of the display, in which the backlight comprises: a light guide, a visible light source for supplying light to the light guide, first fluorescent material forming the first regions, a first ultraviolet light source for illuminating the fluorescent material, and filter material disposed between the backlight and the first regions for blocking visible light and for passing ultraviolet light from the first ultraviolet light source to the first regions.

18. A display as claimed in claim 17, comprising filter material disposed between the at least one portion and the spatial light modulator for blocking ultraviolet light.

19. A display as claimed in claim 17, in which the visible and ultraviolet light sources are arranged to supply light in first and second directions respectively.

20. A display as claimed in claim 19, in which first and second light-redirecting elements are provided on a surface of the light guide.

21. A display as claimed in claim 17, in which the first fluorescent material is dispersed in a visible light scattering medium.

22. A display as claimed in claim 17, in which the first fluorescent material of each first region is arranged to emit light of two color components.

23. A display comprising a backlight and a spatial light modulator for modulating light from the backlight, the backlight having a light-output surface, at least one portion of which comprises a plurality of first regions arranged to output light in a multiple-view mode of the display, the whole of the at least one portion being arranged to output light in a single-view mode of the display, in which the at least one portion comprises a plurality of third regions arranged to output light in a further multiple-view mode of the display, and the first and third regions extend in orthogonal directions.

24. A display comprising a backlight and a spatial light modulator for modulating light from the backlight, the backlight having a light-output surface, at least one portion of which comprises a plurality of first regions arranged to output light in a multiple-view mode of the display, the whole of the at least one portion being arranged to output light in a single-view mode of the display, in which the backlight comprises: a light guide, a visible light source for supplying light to the light guide, first fluorescent material forming the first regions, and first ultraviolet light source for illuminating the fluorescent material, and the at least one portion comprises a plurality of third regions arranged to output light in a further multiple-view mode of the display and the plurality of third regions are formed by second fluorescent material, the backlight comprising a second ultraviolet light source, the first and second ultraviolet light sources being arranged to emit first and second wavelengths in response to which the first and second fluorescent materials, respectively, fluoresce.

25. A display as claimed in claim 23, in which the first and third regions are substantially disposed in first and second planes, respectively, which are spaced apart in a direction of light output from the backlight.

26. A display as claimed in claim 1, comprising an array of lenses at the first regions.

27. A display as claimed in claim 1, in which the at least one portion comprises a plurality of second regions arranged to output light in the multiple-view mode.

28. A display as claimed in claim 2, comprising an array of lenses, with each lens of the array being arranged to receive light from at least one first region and at least one second region and to direct the received light in first and second different directions respectively towards the spatial light modulator.

29. A display as claimed in claim 28, in which the first and second regions are arranged to output light simultaneously in the single-view mode of the display.

30. A display as claimed in claim 28, comprising a plurality of further regions, with each lens of the array being arranged to receive light from at least one further region and to direct the light in a further direction, different to the first and second directions, towards the spatial light modulator.

31. A display as claimed in claim 30, in which the first, second and further regions are arranged to output light simultaneously in the single-view mode of the display.

32. A display as claimed in claim 1, in which the first regions are elongate.

33. A display as claimed in claim 32, in which the first regions are substantially parallel.

34. A display as claimed in claim 33, in which the first regions are substantially uniformly spaced apart.

35. A display as claimed in claim 1, in which the spatial light modulator has a transmissive mode of operation.

36. A display as claimed in claim 35, in which the spatial light modulator is a liquid crystal device.

* * * * *